United States Patent
Wijetunga et al.

(10) Patent No.: US 11,782,476 B2
(45) Date of Patent: Oct. 10, 2023

(54) CIRCUITS AND METHODS FOR SAMPLE TIMING IN CORRELATED AND UNCORRELATED SIGNALING ENVIRONMENTS

(71) Applicant: Rambus Inc., San Jose, CA (US)

(72) Inventors: Panduka Wijetunga, Thousand Oaks, CA (US); Marcial Chua, Thousand Oaks, CA (US); Srinivas Satish Babu Bamdhamravuri, Newbury Park, CA (US); Abhishek Desai, Newbury Park, CA (US); Philip Lu, Camarillo, CA (US); Cosmin Iorga, Westlake Village, CA (US)

(73) Assignee: Rambus Inc., San Jose, CA (US)

( * ) Notice: Subject to any disclaimer, the term of this patent is extended or adjusted under 35 U.S.C. 154(b) by 11 days.

(21) Appl. No.: 17/529,515

(22) Filed: Nov. 18, 2021

(65) Prior Publication Data

US 2022/0179444 A1    Jun. 9, 2022

Related U.S. Application Data

(60) Provisional application No. 63/121,427, filed on Dec. 4, 2020.

(51) Int. Cl.
*G06F 1/10* (2006.01)
(52) U.S. Cl.
CPC ........................................ *G06F 1/10* (2013.01)
(58) Field of Classification Search
CPC ....................................................... G06F 1/10
See application file for complete search history.

(56) References Cited

U.S. PATENT DOCUMENTS

| | | | |
|---|---|---|---|
| 6,249,559 B1 * | 6/2001 | Jun | H03C 1/60 375/376 |
| 6,570,944 B2 | 5/2003 | Best et al. | |
| 6,879,195 B2 | 4/2005 | Green et al. | |
| 6,963,232 B2 | 11/2005 | Frans et al. | |
| 7,254,797 B2 | 8/2007 | Garlepp | |
| 7,336,749 B2 | 2/2008 | Garlepp | |
| 7,368,961 B2 | 5/2008 | Werner et al. | |

(Continued)

OTHER PUBLICATIONS

Hanumolu et al., "A Wide-Tracking Range Clock and Data Recovery Circuit," IEEE Journal of Solid-State Circuits, vol. 43, No. 2, Feb. 2008, pp. 425-439, 15 pages.

(Continued)

*Primary Examiner* — Phil K Nguyen
(74) *Attorney, Agent, or Firm* — Silicon Edge Law Group LLP; Arthur J. Behiel

(57) ABSTRACT

A memory controller conveys a clock signal with command and address signals to a registered clock driver (RCD) on a memory module. A controller-side chip interface on the RCD supports both source-synchronous and filtered clocking for receipt of the command and address signals, the selection between the two clocking schemes dependent upon the noise environment impacting the clock and command/address signals. If the noise is predominantly correlated, then the chip interface is placed in a source-synchronous clocking mode. If the noise is predominantly uncorrelated, then the chip interface is placed in a filtered clocking mode that filters out uncorrelated noise from the clock signal.

11 Claims, 2 Drawing Sheets

(56) References Cited

U.S. PATENT DOCUMENTS

| | | | |
|---|---|---|---|
| 7,590,175 B2 | 9/2009 | Leibowitz et al. | |
| 8,229,020 B2 | 7/2012 | Huang et al. | |
| 8,548,110 B2 | 10/2013 | Lin et al. | |
| 2003/0156534 A1* | 8/2003 | Coulson | H04L 27/2647 370/210 |
| 2009/0262842 A1* | 10/2009 | Gu | H04L 27/2662 375/260 |
| 2010/0316090 A1* | 12/2010 | Chester | H04J 13/0018 375/147 |
| 2012/0314820 A1* | 12/2012 | Kang | H04L 27/2671 375/346 |
| 2017/0237548 A1* | 8/2017 | Kerekes | H04L 7/033 375/354 |

OTHER PUBLICATIONS

Zammit, "Understanding DDR Memory Training," Librecore.org, downloaded Nov. 9, 2020, from https://github.com/librecore-org/librecore/wiki/Understanding-DDR-Memory-Training, Nov. 23, 2016, 7 pages.

JEDEC Standard, DDR2 SDRAM Specification, JESD79-2E, Revision of JESD79-2D), Apr. 2008, JEDEC Solid State Technology Association 2008, 128 pages.

JEDEC Standard, "DDR3 SDRAM, JESD79-3C, REvision of JESD79-3B, Apr. 2008", JEDEC Solid State Technology Association, Nov. 2008, 211 pages.

Freescale Semiconductor, "i.MX53 DDR Calibration," Application Note, Doc. No. AN4466, Rev. 1, May 2013, Freescale Semiconductor, Inc., May 2013, 44 pages.

\* cited by examiner

CIRCUITS AND METHODS FOR SAMPLE TIMING IN CORRELATED AND UNCORRELATED SIGNALING ENVIRONMENTS

BACKGROUND

Memory controllers are digital circuits that manage the flow of data to and from one or more memory devices. A memory controller can be implemented as a special-purpose integrated circuit (IC), or can be integrated with a general-purpose IC, e.g. a central processing unit (CPU). Main memory, typically implemented using memory components with arrays of dynamic random-access memory (DRAM), can likewise be implemented as a special-purpose IC, or integrated with other functionality.

Computer memory systems are commonly synchronous, which means that digital signals (streams of data, control, and address symbols) conveyed between a controller component and a memory component are transmitted from one component on periodic edges of a clock signal and sampled by the other component on edges of the same clock signal. The maximum signaling rate for systems that employ a shared clock signal is limited because signal transmission delays alter the timing of clock edges relative to the symbols they are meant to sample. Complicating this problem, symbol and clock-edge timing change with temperature and supply voltage. Some memory systems therefore forego the shared clock signal in favor of a timing reference that is forwarded with the symbols to be sampled. The timing reference and symbols traverse similar paths so signal distortion—noise—is correlated between them. When noise is correlated, symbols and the timing reference experience the same propagation delays and thus arrive at their destinations in the correct temporal alignment for the timing reference to sample the symbols.

BRIEF DESCRIPTION OF THE FIGURES

The present disclosure is illustrated by way of example, and not by way of limitation, in the figures of the accompanying drawings. For elements with numerical designations the first digit indicates the figure in which the element is introduced, and like references refer to similar elements within and between figures.

FIG. 2 depicts an embodiment of clock driver 125 of FIG. 1, like-identified elements being the same or similar.

DETAILED DESCRIPTION

Figure 1:
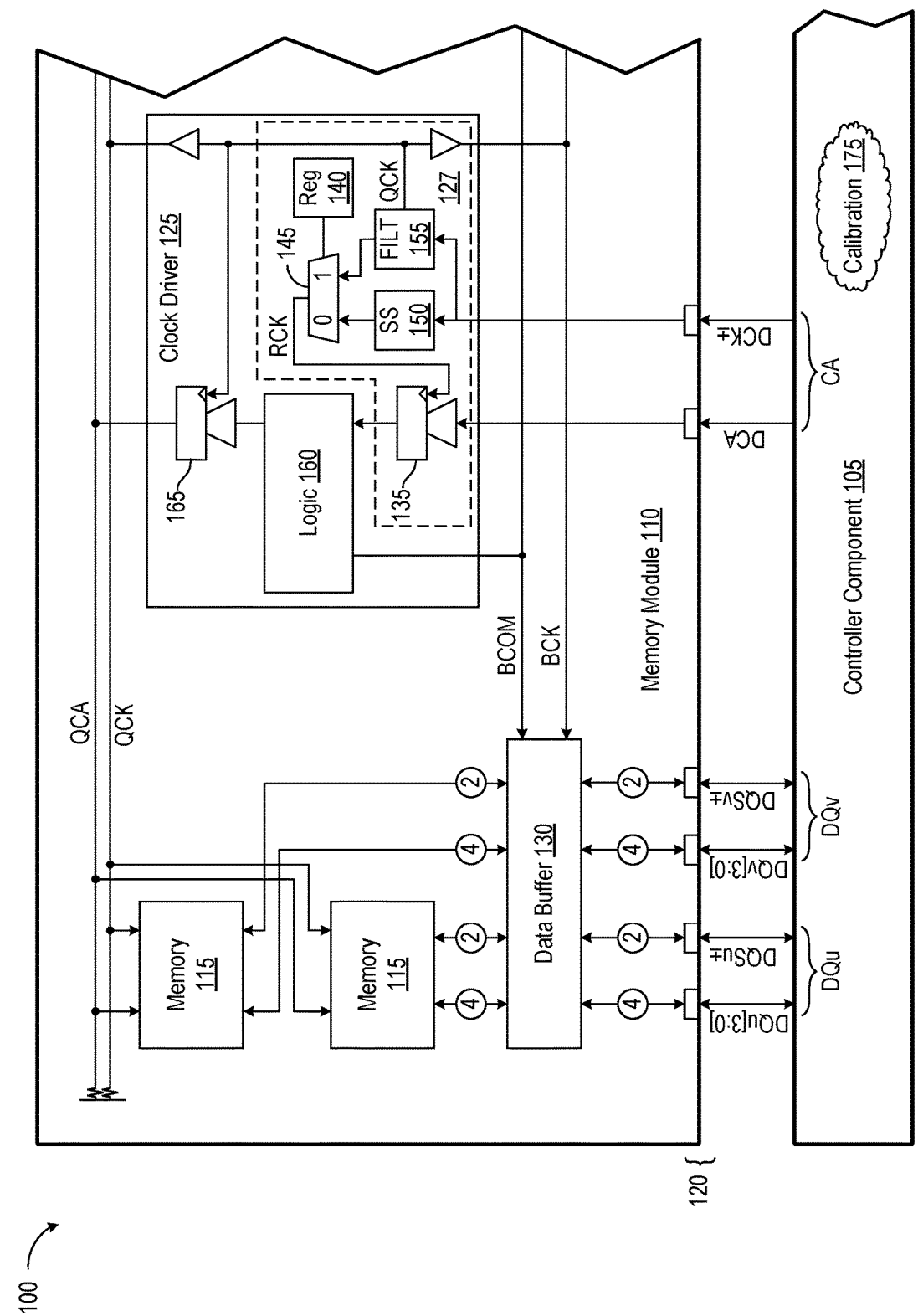
FIG. 1 depicts a memory system 100 in which a controller component 105 issues address and control signals to a memory module 110.

FIG. 1 depicts a memory system 100 in which a controller component 105 issues address and control signals to a memory module 110 to manage the flow of read and write data to and from a collection of memory components 115. Controller component 105 issues complementary strobe signals DQSu± and DQSv± as timing-reference signals that accompany respective parallel, single-ended data signals DQu[3:0] and DQv[3:0] to a module connector 120. Controller component 105 also provides a clock signal DCK±, likewise complementary in this embodiment, as a separate timing reference for command and address signals DCA to a clock driver 125. A controller-side chip interface 127 on clock driver 125 supports source-synchronous and filtered clocking for receipt of symbols on port DCA, the selection between the two clocking schemes dependent upon the noise environment. If the noise impacting system 100 is predominantly correlated between timing-reference signal DCK± and command/address signals DCA, then chip interface 127 is placed in a source-synchronous clocking mode. If the noise is predominantly uncorrelated, then chip interface 127 is placed in a filtered clocking mode that filters out uncorrelated noise from timing-reference signal DCK±. An optional data buffer 130 manages the communication of data between controller component 105 and memory components 115 responsive to command signals BCOM and timing signal BCK from clock driver 125. In other embodiments module connector 120 connects directly to memory components 115.

Clock driver 125, alternatively called a "clock-driver component" or "Registering Clock Driver" (RCD), interprets control signals (e.g., commands, addresses, and chip-select signals) received on port DCA and communicates appropriate command, address, chip-select, and clock signals to memory components 115 (e.g. DRAM packages or dies) via a secondary control interface QCA and clock interface QCK. Addresses associated with the commands on primary port DCA identify target collections of memory cells (not shown) in components 115 and chip-select signals associated with the commands allow clock driver 125 to select individual integrated-circuit DRAM dies, or "chips," for both access and power-state management. Data-buffer components 130 and clock-driver component 125 act as signal buffers to reduce loading on module connector 120. This reduced loading is in large part because each component presents a single load in lieu of the multiple memory components 115 each buffer component serves.

Sampler 135 samples symbols that arrive on input node DCA on edges of a receive clock signal RCK, the phase of which is a function of timing reference DCK± from controller component 105. In a source-synchronous mode, a register 140 directs a multiplexer 145 to select the output of a source-synchronous circuit 150 to provide clock signal RCK. In a filtered mode, register 140 directs multiplexer 145 to select the output of a loop-based filter 155. In either mode, loop-based filter 155 provides a local clock signal QCK that clock driver 125 employs for local timing and delivers to memory components 115 and data buffer 130 as clock signals QCK and BCK, respectively. Logic 160 is included on clock driver 125 to reformat module command/address signals DCA as required for memory components 115, such as to deserialize double-data rate (DDR) signals to single-data rate (SDR) signals, ultimately passing command and address signals QCA to memory component 115 via a synchronous driver 165.

Memory system 100, simplified for brevity, can include many more integrated-circuit components, each of which can include one or more integrated-circuit chips. The term "memory module" commonly refers to a printed circuit board upon which memory components are physically and communicatively coupled to permit easy installation and replacement in computational systems (e.g. personal computers and servers). Memory modules in accordance with one embodiment support a DRAM memory specification called Double Data Rate 5 Synchronous Dynamic Random-Access Memory (DDR5 SDRAM). The DDR5 SDRAM module includes ten eight-bit data-buffer components for a total of eighty data bits divided into two forty-bit sub-channels. Controller component 105 includes calibration circuitry 175 that performs various calibration processes to tune the data and command/address interfaces. Among these processes, calibration circuitry 175 adjusts the timing of timing-reference signal DCK± while monitoring command/address signals DCA for errors. During this process, controller component 105 can select between the source-synchronous and filtered modes based on e.g. the bit-error rates associated with the two modes. Processes for calibrating memory modules are well known to those of skill in the art so a detailed discussion is omitted.

Figure 2:
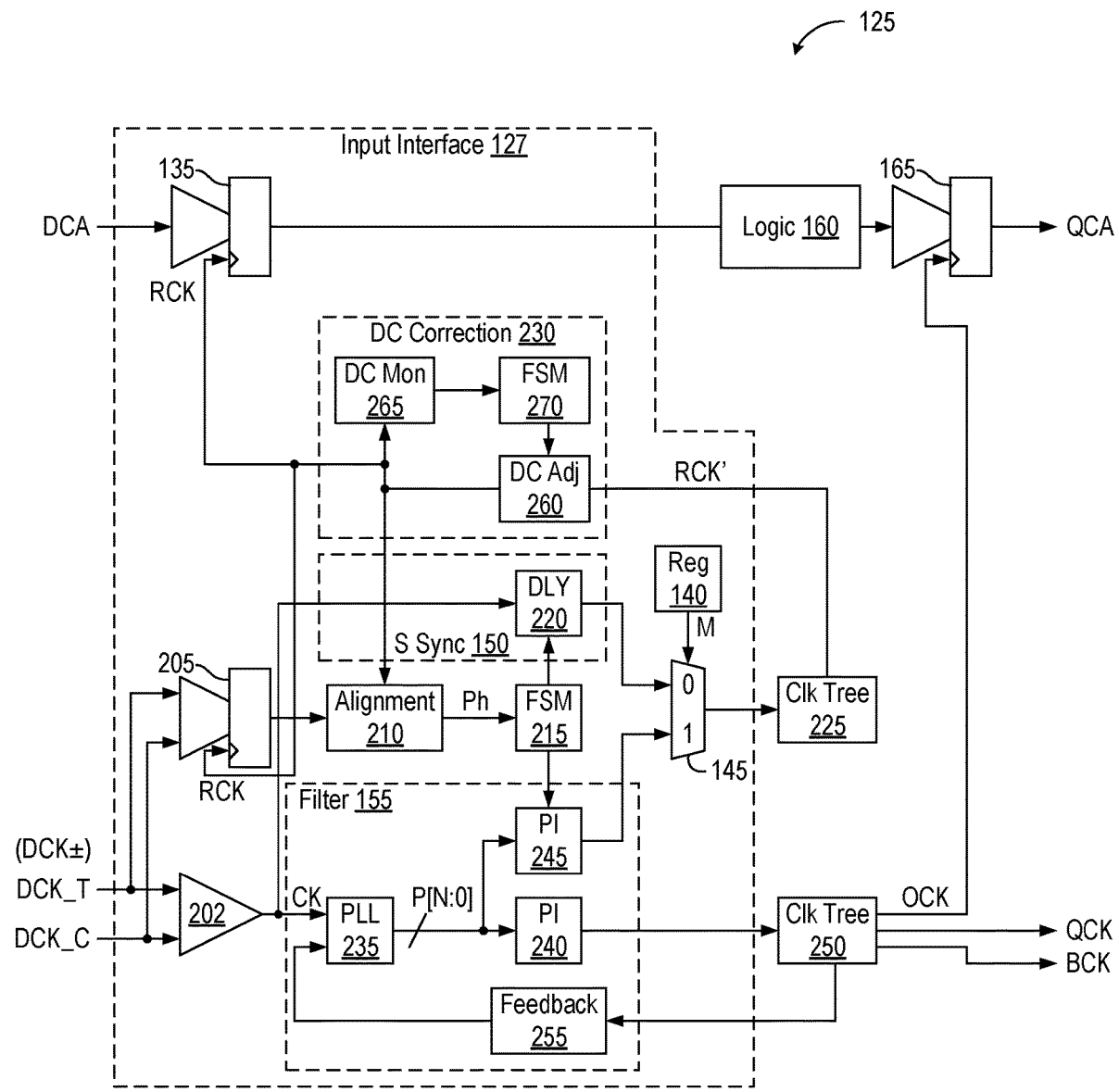

FIG. 2 depicts an embodiment of clock driver 125 of FIG. 1, like-identified elements being the same or similar. Chip interface 127 represents the integrated physical circuits, or "physical layer," in which sampler 135 samples command and address signals DCA from controller component 105 (FIG. 1). Other signals from controller component 105, such as to convey parity and chip-select bits, can also be sampled but are omitted for brevity.

Controller component 105 issues requests with associated addresses to access (e.g. read from or write to) random-access memory. These requests and addresses are conveyed as a series of symbols on port DCA that are timed to edges of clock signal DCK±, shown here as complementary signals DCK_T and DCK_C. Clock driver 125 derives a receive clock signal RCK, an output clock signal OCK, a memory clock signal QCK, and a data-buffer clock signal BCK from reference signal DCK±. Sampler 135 samples signal DCA in time with receive clock signal RCK, driver 165 conveys command and address signals QCA to memory component 115 (FIG. 1) timed to clock signal QCK, and clock signals QCK and BCK are conveyed to the memory components 115 and data buffers 130 to synchronize the various module components.

Though only sampler 135 is depicted, clock tree 225 likewise extends to other clock destinations. In an embodiment that supports DDR5 SDRAM, for example, clock tree 225 extends to ten samplers 135 that operate collectively to capture seven-bit-wide (×7) DDR command/address signals DCA[6:0], a parity signal, and a two chip-select signals. Logic 160 converts the ×7 DDR signals to ×14 single data rate (SDR) command/address signals QCA expected by DRAM memory components. Driver 165 is representative of one or more sets of fourteen drivers, each set serving a collection of DRAM components.

Signals DCA and DCK± are both subject to noise that can limit the speed at which symbols can be conveyed between controller component 105 and clock driver 125. To the extent that this noise is common to both signals—i.e. the noise is correlated—clock driver 125 can preserve phase noise from DCK± in receive clock signal RCK so that sampler 135 filters out that noise. If both signals DCA and DCK± are advanced by correlated noise, for example, then receive clock signal RCK will likewise be advanced to retain phase alignment with symbols expressed in signal DCA. This form of clocking is termed "source synchronous." If noise impacting performance is predominantly uncorrelated, however, then clock driver 125 can filter phase noise from reference signal DCK± in producing receive clock signal RCK. This form of clocking is termed "phase-locked loop (PLL) clocking." Controller component 105 can load register 140 with a value M indicative of a source-synchronous mode (M=0) or a PLL mode (M=1), running test patterns to see which mode produces the best performance. In this context, "performance" in a given noise environment may be measured using e.g. command or bit error rates, error margins, or power usage to achieve a desired level of speed and error performance. Register 140 can be loaded prior to system calibration in a low-speed mode or via a separate command interface, not shown, provided for this purpose.

Reference clock signal DCK± on a like-named timing-reference node is sensed by a differential amplifier 202 that delivers a single-ended clock signal CK to both source-synchronous circuit 150 and loop-based filter 155. A sampler 205 identical to sampler 135 samples clock signal DCK± with receive clock RCK, sending the samples to a phase-alignment circuit 210. Phase-alignment circuit 210 serves as a phase detector, issuing a phase-error signal Ph that is a function of the phase misalignment between clock signal DCK± and receive clock signal RCK. Phase-error signal Ph allows a finite state machine (FSM) 215 to control source-synchronous circuit 150 and loop-based filter 155 as needed to phase adjust receive clock signal RCK to minimize the phase error between signal RCK and clock signal DCK±. FSM 215, responsive to phase-error signal Ph, causes delay element 220 to advance and retard the phase of clock signal RCK until sampled ones and zeros are of equal likelihood. Samplers 135 and 205 are delay matched to ensure RCK is centered to the incoming data eye when RCK is phase locked to the incoming clock DCK±.

Register 140 is set to zero to enter the source-synchronous mode for correlated noise. Source-based circuit 150 phase adjusts clock signal CK using a programmable delay element 220 but retains phase noise from clock signal CK for delivery to a clock tree 225 via multiplexer 145. Clock signal RCK' from clock tree 225 is conveyed to a duty-cycle correction circuit 230 that ensures a 50/50 duty cycle for receive clock signal RCK, important for DDR systems in which symbols are sampled on both rising and falling clock edges. FSM 215 adjusts the delay through delay element 220 to minimize phase error Ph.

Register 140 is set to one to enter the filtered mode for uncorrelated noise. Loop-based filter 155 removes noise from clock signal CK for delivery to clock tree 225 via multiplexer 145. Loop-based filter 155 includes a PLL 235 that produces N+1 clock phases P[N:0] for input to a pair of phase interpolators 240 and 245. Phase interpolator 240 interpolates between phases to issue a clock signal that can vary over a range of phases to a clock tree 250 that extends to multiple destinations as noted previously. A feedback path 255 to an input of PLL 235 simulates the load, and therefore the delay, associated with the other destinations of clock tree 250. The feedback path phase locks phases P[N:0] and the clock signals from clock tree 250 with respect to clock signal CK. Phase interpolator 245 mixes phases P[N:0] to produce receive clock signal RCK'. FSM 215 adjusts phase interpolator 245 to minimize phase-error signal Ph, and thus locks receive clock signal RCK to clock signal CK.

Duty-cycle correction circuit 230 includes a duty-cycle-adjustment circuit 260, a duty-cycle monitor circuit 265, and an FSM 270. Monitor 265 issues a signal indicative of duty-cycle error to FSM 270, which responsively signals adjustment circuit 260 to adjust the duty cycle of signal RCK' toward the desired proportion, e.g. 50%. Circuit 260 can be omitted in SDR systems.

While the present invention has been described in connection with specific embodiments, after reading this disclosure variations of these embodiments will be apparent to those of ordinary skill in the art. For example, some or all of the functionality of data-buffer components can be integrated into the packaging or devices of memory components 115, or into clock driver 125; and data and/or command and address signals can be sampled on alternating adjacent clock or strobe edges (i.e., single data-rate or double-data rate sampling). Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

We claim:

1. A chip interface comprising:
   a timing-reference node to receive a timing-reference signal;
   a source-synchronous circuit coupled to the timing-reference node to issue a source-synchronous signal responsive to the timing-reference signal;
   a filter coupled to the timing-reference node to issue a filtered signal responsive to the timing-reference signal;
   a multiplexer having a source-synchronous input coupled to the source-synchronous circuit to receive the source-synchronous signal, a filtered input coupled to the filter to receive the filtered signal, an output to issue a selected one of the source-synchronous signal and the filtered signal as a receive-clock signal;
   a signal node to receive a series of symbols; and
   a sampler having a sampler input node to receive a series of symbols and a clock node coupled to the multiplexer output to receive the receive-clock signal, the sampler to sample the symbols in response to the receive-clock signal.

2. The chip interface of claim 1, wherein the multiplexer issues the source-synchronous signal in a source-synchronous mode and the filtered signal in a filter mode.

3. The chip interface of claim 2, further comprising a mode register coupled to the multiplexer, the mode register to store a mode value to select one of the source-synchronous mode and the filter mode.

4. The chip interface of claim 2, further comprising a clock tree coupled to the filter, the filter to issue clock signals via the clock tree responsive to the timing-reference signal in the source-synchronous mode and the filter mode.

5. The chip interface of claim 2, further comprising a phase detector to issue an error signal responsive to a phase error between the timing-reference signal and the receive-clock signal in the source-synchronous mode and the filter mode.

6. The chip interface of claim 1, the filter including a phase-locked loop coupled to the timing-reference node to phase lock the filtered signal to the timing-reference signal.

7. The chip interface of claim 1, wherein the timing-reference signal comprises a clock signal.

8. The chip interface of claim 1, wherein the timing-reference signal exhibits a noise profile, and wherein the multiplexer selects the receive-clock signal responsive to the noise profile.

9. The chip interface of claim 1, further comprising a duty-cycle-correction circuit coupled between the sampler and the output of the multiplexer.

10. The chip interface of claim 1, wherein the sampler samples the symbols on rising and falling edges of the receive-clock signal to issue sampled symbols.

11. A memory module comprising:
    a module connector to receive data symbols, command symbols, and a timing-reference signal;
    memory components communicatively coupled to the module connector to receive the data symbols;
    a clock-driver component having:
      a memory interface coupled to the memory components; and
      a clock-driver interface coupled to the module connector to receive the command symbols and the timing-reference symbols, the clock-driver interface including:
        a source-synchronous circuit to issue a source-synchronous signal responsive to the timing-reference signal;
        a filter to issue a filtered signal responsive to the timing-reference signal;
        a multiplexer having a source-synchronous input coupled to the source-synchronous circuit to receive the source-synchronous signal, a filtered input coupled to the filter to receive the filtered signal, an output to issue a selected one of the source-synchronous signal and the filtered signal as a receive-clock signal; and
        a sampler having a sampler input node to receive the command symbols and a clock node coupled to the multiplexer output to receive the receive-clock signal, the sampler to sample the command symbols in time to the receive-clock signal to issue sampled symbols to the memory interface.

* * * * *